(12) United States Patent
Ai et al.

(10) Patent No.: US 9,097,317 B2
(45) Date of Patent: Aug. 4, 2015

(54) EPICYCLICAL GEAR TRANSMISSION WITH IMPROVED LOAD CARRYING CAPABILITY

(75) Inventors: Xiaolan Ai, Massillon, OH (US); Curt Orkin, West Hartford, CT (US); Randy P. Kruse, North Canton, OH (US); Ryan Forbes, Massillon, OH (US); Matthew Wilmer, North Canton, OH (US)

(73) Assignee: The Timken Company, North Canton, OH (US)

( * ) Notice: Subject to any disclaimer, the term of this patent is extended or adjusted under 35 U.S.C. 154(b) by 438 days.

(21) Appl. No.: 13/577,562

(22) PCT Filed: Feb. 11, 2011

(86) PCT No.: PCT/US2011/024446
§ 371 (c)(1),
(2), (4) Date: Aug. 7, 2012

(87) PCT Pub. No.: WO2011/100499
PCT Pub. Date: Aug. 18, 2011

(65) Prior Publication Data
US 2012/0309583 A1    Dec. 6, 2012

Related U.S. Application Data

(60) Provisional application No. 61/303,941, filed on Feb. 12, 2010.

(51) Int. Cl.
*F16H 57/08* (2006.01)
*F16H 1/28* (2006.01)
*B64C 27/12* (2006.01)

(52) U.S. Cl.
CPC . *F16H 1/28* (2013.01); *B64C 27/12* (2013.01); *F16H 57/082* (2013.01); *F16H 2001/2881* (2013.01)

(58) Field of Classification Search
CPC . F16H 1/28; F16H 2001/2881; F16H 57/082; B64C 27/12
USPC ............... 475/331, 338, 339, 341, 346, 348
See application file for complete search history.

(56) References Cited

U.S. PATENT DOCUMENTS 3,675,510 A * 7/1972 Duggar, Jr. ............... 475/342
4,158,967 A * 6/1979 Vatterott .................... 74/410

(Continued)

FOREIGN PATENT DOCUMENTS

WO    WO 9532895    12/1995

OTHER PUBLICATIONS

International Search Report for PCT application PCT/US2011/024446 mailed May 11, 2011.

(Continued)

*Primary Examiner* — Justin Holmes
*Assistant Examiner* — Stacey Fluhart
(74) *Attorney, Agent, or Firm* — Michael Best & Friedrich LLP

(57) ABSTRACT

A high ratio epicyclic gear train (A) with improved load carrying capability for transmitting power from a driven input shaft, such as may be driven by a turbine engine or engines, to a output shaft, as may be coupled to a rotor of a rotary wing aircraft. The compound epicyclic gear train incorporates a load sharing mechanism consisting of a drive sun gear (10), an idler sun gear (11), a ring gear (12), a set of drive planet gear assemblies (13), a set of idler planet gear assemblies (14), and a planet carrier assembly (15) coupled to provide at least two power pathways through said epicyclic gear train (A) between said driven input shaft and said output shaft to provide an improved overall power density of the transmission.

16 Claims, 6 Drawing Sheets

(56) References Cited

U.S. PATENT DOCUMENTS

| | | | |
|---|---|---|---|
| 5,716,300 A | * | 2/1998 | Sammataro et al. .......... 475/346 |
| 5,797,185 A | | 8/1998 | Sammataro et al. |
| 6,966,865 B2 | | 11/2005 | Drago et al. |
| 7,507,180 B2 | | 3/2009 | Robuck |
| 2004/0248689 A1 | * | 12/2004 | Milner ......................... 475/185 |
| 2010/0113210 A1 | * | 5/2010 | Lopez et al. .................. 475/331 |
| 2011/0190094 A1 | * | 8/2011 | Polacco et al. ................ 475/331 |

OTHER PUBLICATIONS

Written Opinion of the International Search Authority for PCT application PCT/US2011/024446.

* cited by examiner

EPICYCLICAL GEAR TRANSMISSION WITH IMPROVED LOAD CARRYING CAPABILITY

CROSS-REFERENCE TO RELATED APPLICATIONS

The present application is related to, and claims priority from, U.S. Provisional Application Ser. No. 61/303,941 filed on Feb. 12, 2010 and International Application PCT/US2011/024446 filed Feb. 11, 2011 and published under International Publication No. WO 2011/100499, both of which are incorporated herein by reference.

STATEMENT REGARDING FEDERALLY SPONSORED RESEARCH

Not Applicable.

BACKGROUND OF THE INVENTION

The present invention relates generally to an epicyclic gear train such as for use in rotary wing aircraft, and in particular, to a high-ratio epicyclic gear transmission incorporating idler sun and planet gears to provide an increased load carrying capability.

Rotary wing aircraft typically employ one or more high-speed turbine engines to drive a rotor providing lift and propulsion. A main gear transmission between the engine and the rotor is necessary to transmit engine power to the rotor while reducing the input engine speed to the appropriate output rotor speed. The main gear transmission is usually the heaviest subsystem in the drive train of the aircraft. Increasing power throughput and reducing the weight of the transmission is very desirable for modern rotary wing aircraft.

Owning to favorable power density values, epicyclic gear trains are the most popular gear system for the use in aircraft drive trains, being used virtually in all rotary wing aircraft main rotor drive transmission. A typical transmission configuration of a simple epicyclic gear train consists of a sun gear, a co-axially arranged ring gear, a planet carrier, and a set of planet gears (typically between three and six) supported on the planet carrier. The planet gears are spaced in the annular space between the sun gear and the ring gear. The sun gear is driven by an input shaft of the gear train and the planet carrier is operatively connected to an output shaft of the gear train. The ring gear is usually fixed to a transmission housing. The construction of the epicyclic gear train provides multiple load paths from the input shaft through the multiple planets to the output shaft, and the load is shared among the planet gears. However, as the speed ratio increases, the number of planet gears that can be packed into the epicyclic gear trains is limited, thereby limiting the load sharing capabilities.

Compound epicyclic gear trains have been utilized to improve the speed ratio of a simple epicyclic gear trains, such as shown in U.S. Pat. No. 6,966,865 to Drago et al., which discloses an epicyclic gear train employing multiple planet clusters. Each planet cluster in the compound epicyclic gear train includes a planet gear shaft, a large planet gear, and two small planet gears. The large planet gear and the two small planet gears are mounted on, and rotate with, the same planet gear shaft. The large planet gear meshes with a sun gear and the small planet gears each mesh with a fixed ring gear which includes two separate rings. To incorporate the maximum possible number of planet clusters into the gear train, two sets of planet clusters are employed. Each planet clusters is arranged with the large planets staggered axially, meshing with the sun gear, or with tilted-axis planet clusters, as shown in U.S. Pat. No. 7,507,180 to Robuck.

While such simple and compound epicyclic gear trains are suitable for use in the drive trains of rotary wing aircraft, further improvement in power density values for the drive trains is very desirable, as a reduction in weight and package size provides additional advantages over current epicyclic gear trains. Accordingly, it would be advantageous to provide an improved high-ratio epicyclical gear train having an increased load carrying capacity.

BRIEF SUMMARY OF THE INVENTION

Briefly stated, the present disclosure provides a high ratio epicyclic gear train with improved load carrying capability for transmitting power from a driven input shaft, such as may be driven by a turbine engine or engines, to a output shaft, as may be coupled to a rotor of a rotary wing aircraft. The compound epicyclic gear train incorporates a load sharing mechanism consisting of idler sun gear and idler planet gears to provide an improved overall power density of the transmission.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1A:
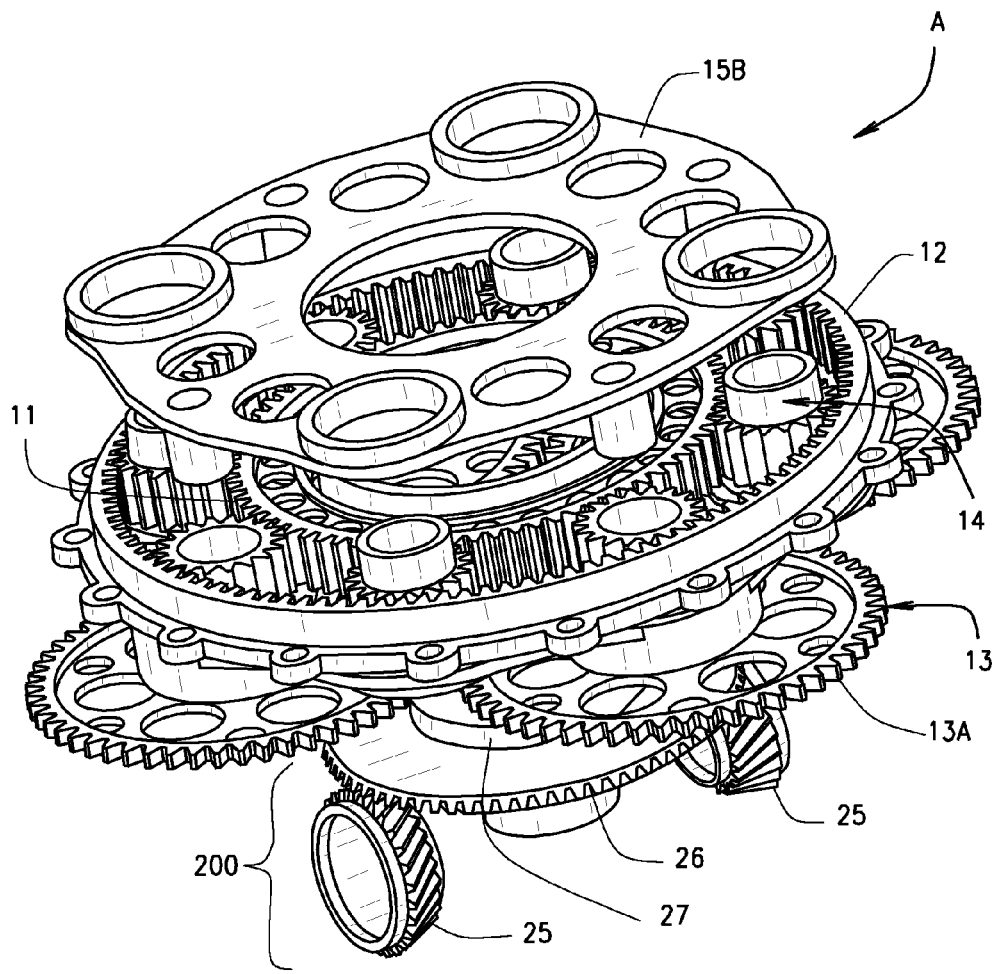
FIG. 1A is an exploded view of an epicyclic gear train of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1B:
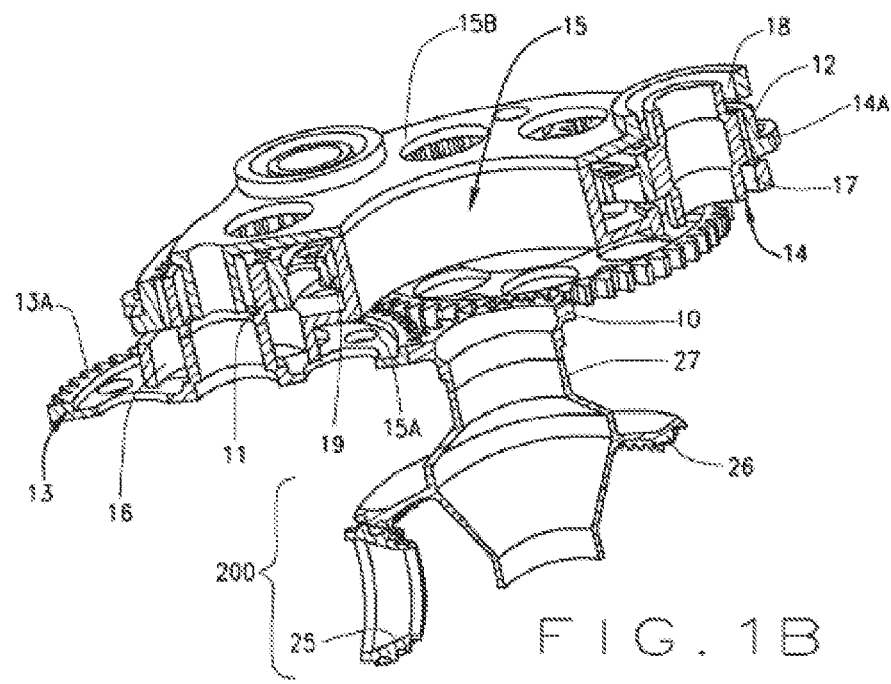
FIG. 1B is a perspective sectional view of the epicyclic gear train of FIG. 1A.
Figure 1C:
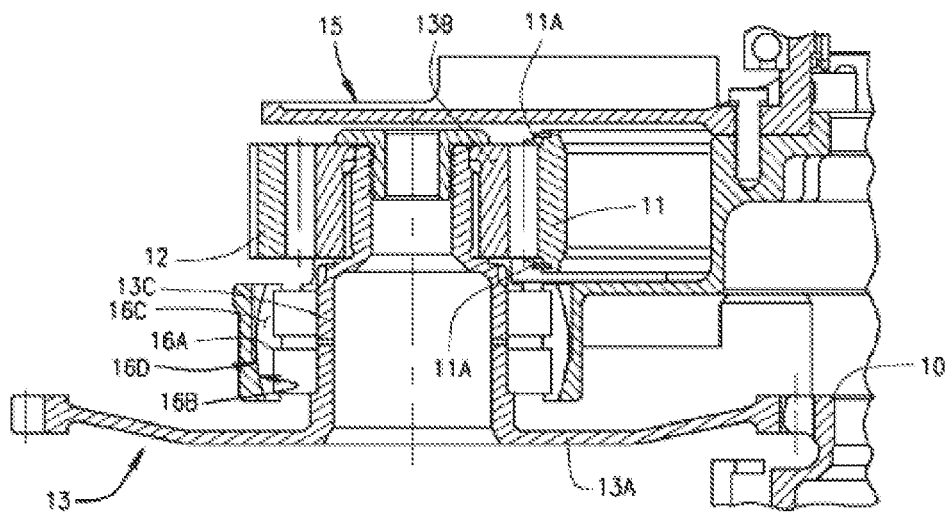
FIG. 1C is a sectional view of a planet cluster in the epicyclic gear train of FIG. 1A.
Figure 2:
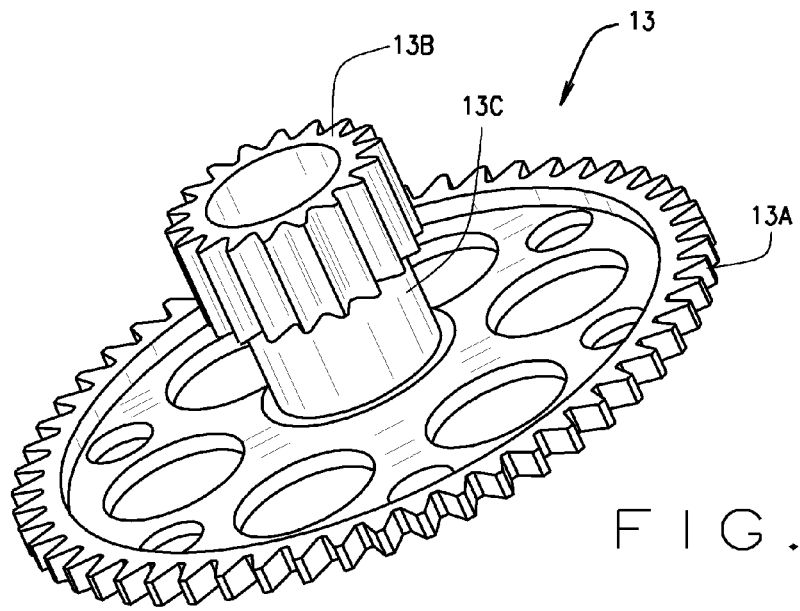
FIG. 2 is a perspective view of a drive planet gear utilized in the epicyclic gear train of FIG. 1A.
Figure 3:
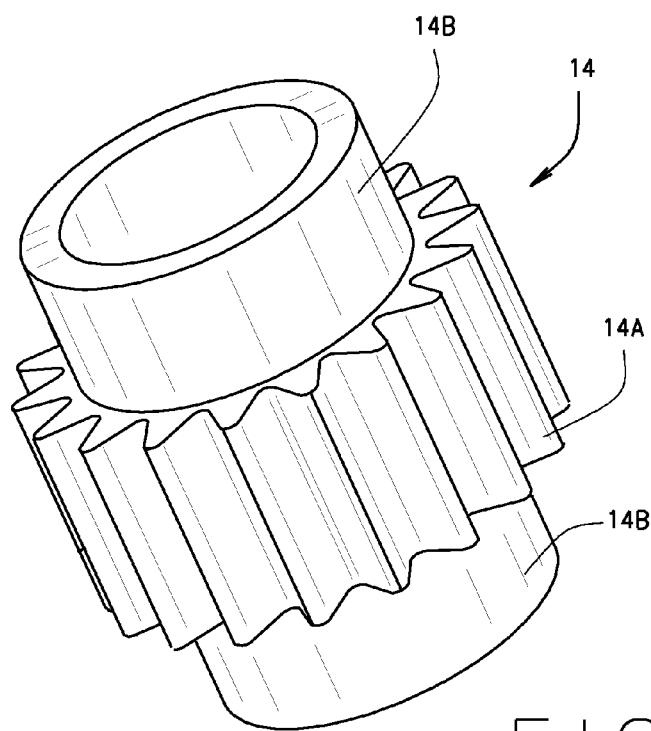
FIG. 3 is a perspective view of an idler planet gear utilized in the epicyclic gear train of FIG. 1A.

Turning to the Figures, and to FIGS. 1A-1C in particular, a first embodiment of the present disclosure is shown, wherein a high-ratio epicyclic gear train (A) of the present disclosure is shown comprising a drive sun gear 10, an idler sun gear 11, a ring gear 12, a set of drive planet gear assemblies 13, a set of idler planet gear assemblies 14, and a planet gear carrier assembly 15. The drive planet gear assembly 13 is a planet cluster, including as shown in FIG. 2, a large planet gear 13A, at least one small planet gear 13B and a planet shaft 13C onto which both the large and small planet gears are secured in an axially spaced configuration. As seen in FIG. 3, each idler planet gear assembly 14 includes an idler planet gear 14A and an idler planet shaft 14B intervened by the idler planet gear 14A. The planet gear carrier assembly 15, best seen in FIG. 1B, is comprised of a planet carrier base 15A and a planet carrier plate 15B. The planet carrier base 15A and the planet carrier plate 15B can be optionally formed into an integral planet carrier assembly 15, or may be secured together by any suitable means.

The drive sun gear 10 and the idler sun gear 11 are co-axially arranged and spaced apart along a center axis of the epicyclic gear train (A), with the ring gear 12 located co-axially around the idler sun gear 11. The drive planet gear assemblies 13 are each arranged in the annular space between the ring gear 12 and each of the sun gears 10 and 11. Each drive planet gear assembly 13 is supported on the planet gear carrier assembly 15 by rolling element bearings (shown in FIG. 1C) at 16, while the idler sun gear 11 is restricted axially on the planet gear carrier assembly 15 by a bearing or bearings (not shown) at 19. Optionally, the bearings 19 can be replaced with thrust plates 11A (shown in FIG. 1C) to axially secure the idler sun gear 11 in engagement with the small planet gears 13B.

The idler planet gear assemblies 14 are arranged in the annular space between the ring gear 12 and the idler sun gear 11, coplanar with the small planet gears 13B of the drive planet gear assemblies 13, and are supported on the planet carrier 15 by bearings (not shown) at 17 and 18. The drive sun gear 10 meshes with, and drives, the large planet gears 13A, while the idler sun gear 11 meshes with both the small planet gears 13B and the idler planet gears 14A. Similar to the idler sun gear 11, the ring gear 12 meshes with both the small planet gears 13B and the idler planet gears 14A.

Input power from a turbine engine or other power source is delivered to the epicyclic gear train (A) through a first stage reduction gear system 200. The first stage reduction gear system 200 preferably consists of a pair of bevel pinions 25, which are driven by the power source and a bevel gear 26. The pair of bevel pinions 25 are coupled to the bevel gear 26 which receives the combined driving force of the pair of bevel pinions 25, and which in turn is coupled to the drive sun gear 10 by a shaft 27. The power is then delivered to the drive sun gear 10 through drive shaft 7. During operation, the drive sun gear 10 drives the large planet gears 13A, splitting the power among each of the drive planet gear clusters 13. A portion of the power is transmitted to, and combined at, the planet carrier 15 through the supporting bearings at 16. The large planet gears 13A drive the corresponding small planet gears 13B, transmitting a portion of the power from the large planet gears 13A to the small planet gears 13B. The small planet gears 13B in turn drive the idler sun gear 11 which subsequently drives the idler planet gear assemblies 14 through the idler planet gears 14A. The remaining power is transmitted through the idler planet gear assemblies 14 and re-combined at the planet carrier 15. The resulting output of the epicyclic gear train (A) is conveyed to an output shaft (not shown) coupled to the planet carrier 15.

As described above, there are two power pathways through the epicyclic gear train (A) from the input shaft to the output shaft. The first power pathway is through the drive planet gear assemblies 13 directly to the planet carrier 15, and the second is through the idler sun gear 11, through the idler planet gear assemblies 14, to the planet carrier 15. To effectively utilize the idler planet gear assemblies 14 in torque and/or power transmission, and thus improve the epicyclic gear train (A) power density, the small planet gears 13A in the drive planet gear assemblies 13 are purposely set to float in an annular space between the idler sun gear 11 and the ring gear 12, in relation to the idler planet gears 14A.

As can be appreciated, a greater number of load carrying planet gears (13B and 14A), due to their smaller size, can be packaged into the epicyclic gear train (A) as compared to the number which can be utilized in conventional simple and compound epicyclic gear trains. These load carrying planet gears are light in weight and significantly improved the load capacity, and thus power density, of the epicyclic gear train (A).

Figure 4:
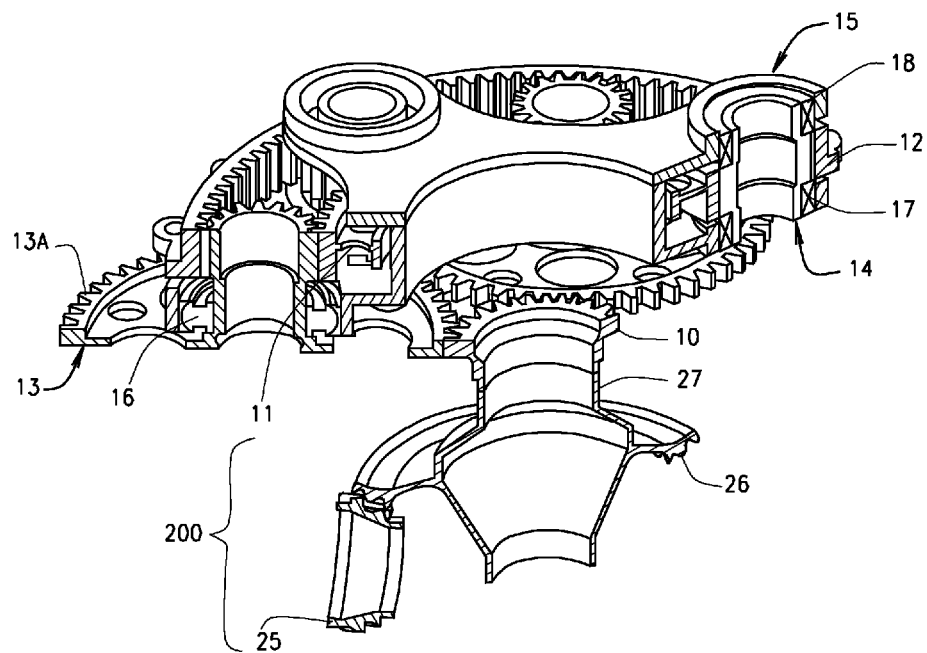
FIG. 4 is a perspective sectional view of an alternate configuration for an epicyclic gear train of the present disclosure incorporating floating small planet gears with external self-aligning bearings in the drive planet cluster.

Those of ordinary skill will recognize that there are a number of possible design variations for the epicyclic gear train (A) of the present disclosure that allow for a floating small planet gear 13A in the drive planet gear assembly 13. For example, FIGS. 10 and 4 show one variations, where an external self-aligning bearing 16A is employed. The bearing is positioned between the large planet gear 13A and the small planet gear 13B. The self-aligning bearing 16A is a cylindrical roller bearing. The outer diameter surface 16B of an outer race ring 16C of the bearing 16A has a spherical configuration. The outer race ring 16C is seated in a matching spherical bearing seat 16D that is housed in the planet gear carrier assembly 15. Other types of self-aligning bearings, such as spherical ball bearings or spherical roller bearings, can also be used for the bearing 16.

Figure 5A:
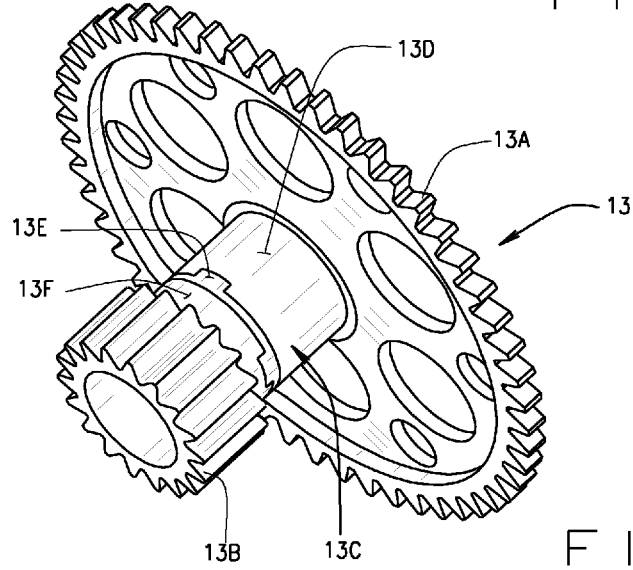
FIG. 5A is a perspective view of an alternate drive planet gear utilizing an Oldham coupling.
Figure 5B:
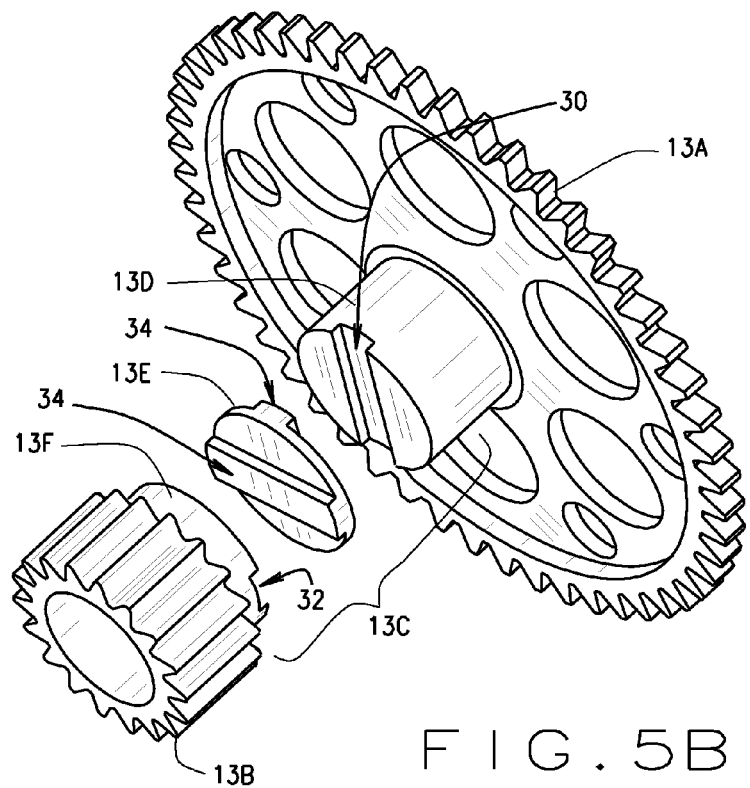
FIG. 5B is an exploded view of the alternate drive planet gear of FIG. 5A.
Figure 6:
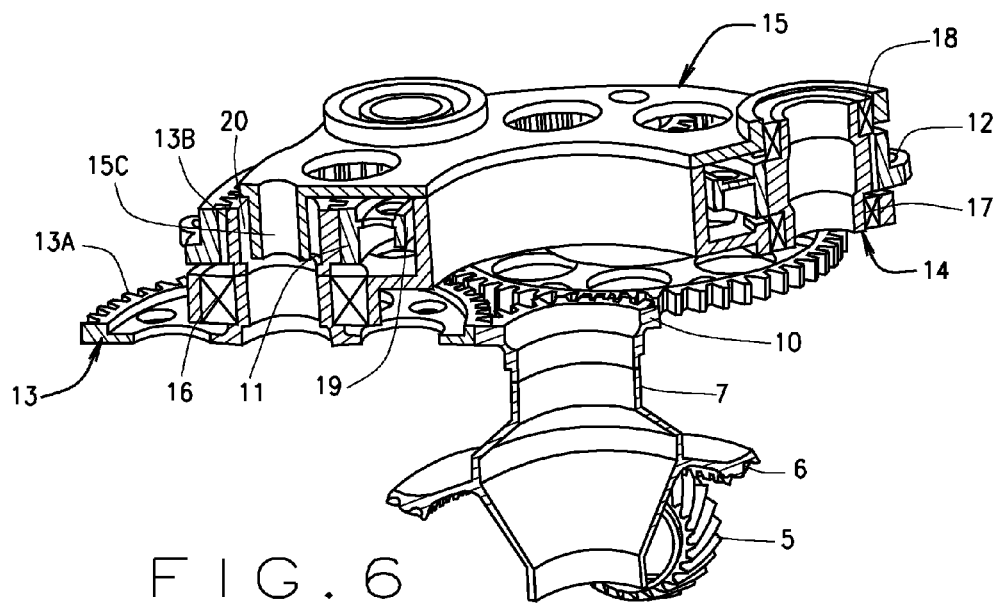
FIG. 6 is a perspective sectional view of an epicyclic gear train embodiment utilizing drive planet gears of FIG. 5A.

An alternate configuration of the epicyclic gear train (A) utilizes an Oldham coupling between the larger planet gear 13A and the small planet gear 13B in each drive planet gear assembly 13, as shown in FIG. 5. The planet shaft 13C contains three segments. The first segment 13D is fixed to the large planet gear 13A at one end; the other end has a simple or dovetail-shaped slot 30 across it's diameter at the end face. Likewise, the second segment 13F is fixed to the small planet gear 13B at one end; the other end has a simple or dovetail-shaped slot 32 across its end face. The two slots 30, 32 are arranged perpendicular to each other. The third segment 13E has two perpendicular ridges 34 made respectively at both end faces. Each ridge 34 mates with a respective slot 30, 32 on the segment 13D and segment 13F. The Oldham coupling permits torque to be transmitted from the large planet gear 13A to the small planet gear 13B while allowing the axis of small planet gear to be offset from the axis of the large planet gear 13A, such that the small drive planet gear 13B is free to float in the annular space between the ring gear 12 and the idler sun gear 11.

Optional bearings 20 may be used to support the small drive planet gears 13B. The bearings 20 provides a predetermined supporting stiffness in relation to the stiffness of idler planet gear support bearings 17 and 18. Bearings 20 permits the small planet gears 13B to float under a load, and thus to distribute the load in a predetermined proportion between the small planet gears 13B and the idler planet gears 14A.

Figure 7:
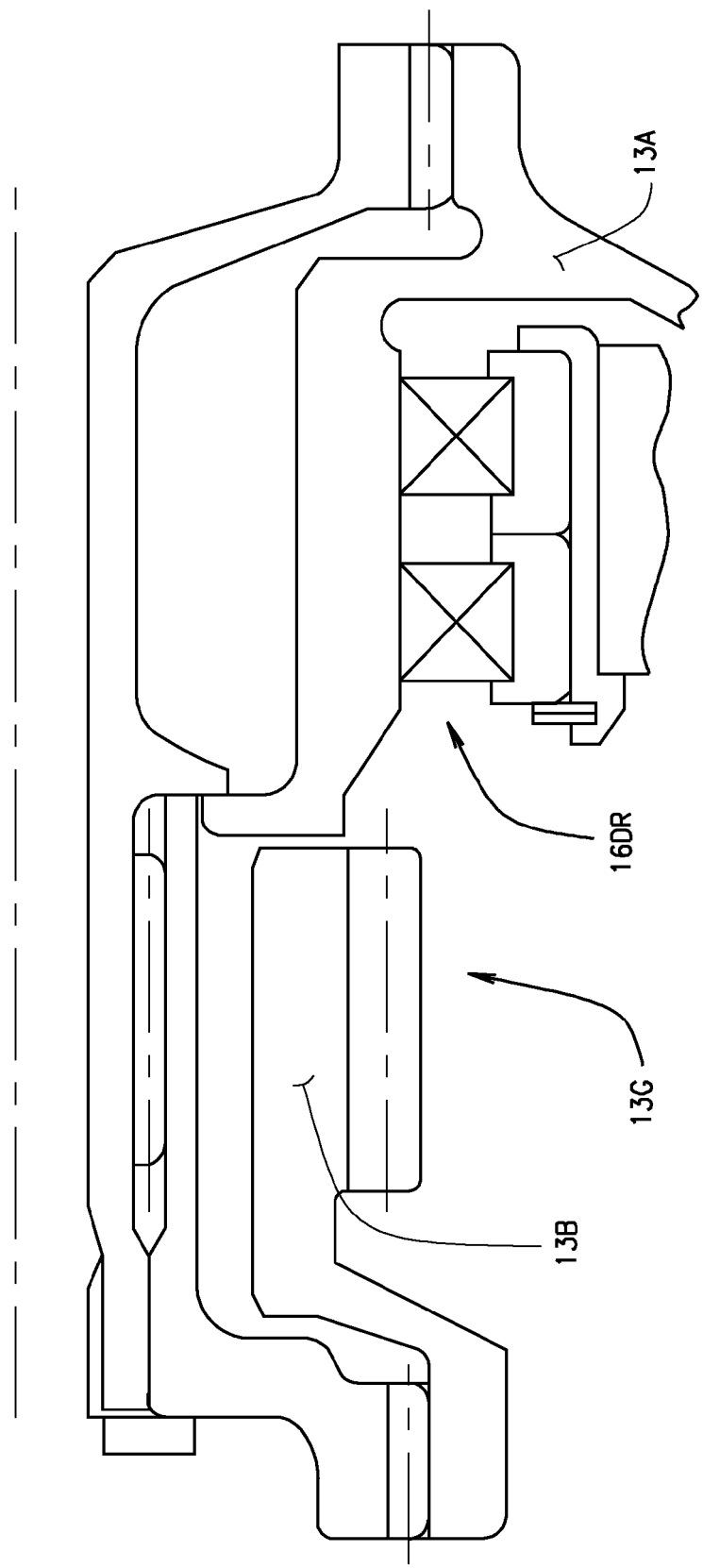
FIG. 7 is a sectional view of an alternate embodiment of the epicyclic gear train wherein a gear coupling is used to transmit torque from the larger planet gears to the small planet while allowing the small planet gears to float with respect to the large planet gears.

A further design variation is shown in FIG. 7, where a drive planet gear assembly 13G with a gear coupling is used to transmit torque from the larger planet gears 13A, supported on a double row roller bearing 16DR, to the small planet 13B, while allowing the small planet gear 13B to float with respect to the large planet gear 13A.

Other design variations are possible without deviating from the sprit of current invention. The embodiment and design variations disclosed herein should be considered as ways for explaining or implementing current invention, not as ways to limit the scope of current invention.

Other usage of current invention is also possible, for example, the input shaft and output shaft to the epicyclic gear train (A) can be reversed with proper design alterations to allow the high-ratio epicyclic gear train (A) of the present disclosure to be used as a speed increaser, such as is needed for a wind energy generation main gear transmission system.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An epicyclic gear train (A) having a drive sun gear 10 coupled to an input shaft, an idler sun gear 11, and a ring gear 12 one of said sun gear or ring gear being fixed to a housing of the epicyclic gear train, comprising:
a set of drive planet gear assemblies 13 each including a large planet gear 13A in engagement with the drive sun gear 10, and at least one small planet gear 13B axially spaced along a planet shaft 13C and in engagement with both said idler sun gear 11 and said ring gear 12;
a set of idler planet gear assemblies 14 each including an idler planet gear 14A and an idler planet shaft 14B, said idler planet gears 14A in engagement with said idler sun gear 11 and said ring gear 12 and not in meshing engagement with said drive sun gear 10;
a planet gear carrier assembly 15 coupled to an output shaft, said planet gear carrier assembly including a planet carrier base 15A and a planet carrier plate 15B, said planet carrier plate disposed axially opposite from said drive sun gear 10;
wherein the drive sun gear 10 and the idler sun gear 11 are co-axially arranged and spaced apart along a center axis;
wherein the ring gear 12 is disposed co-axially around the idler sun gear 11;
wherein the drive planet gear assemblies 13 are arranged in an annular region between the ring gear 12 and the idler sun gear 11;
wherein the idler planet gear assemblies 14 are arranged in the annular space between the ring gear 12 and the idler sun gear 11; and
wherein said drive planet gear assemblies 13, said idler planet gear assembly 14, said idler sun gear 11, and said ring gear 12 are configured to provide at least two power paths between said drive sun gear 10 coupled to said input shaft and said planet gear assembly 15 coupled to said output shaft.

2. The epicyclic gear train of claim 1 wherein said drive planet gear assemblies 13 are supported by said planet carrier base 15A with rolling element bearings 16.

3. The epicyclic gear train of claim 1 wherein said idler planet gear assemblies 14 are supported on said planet gear carrier assembly 15 by bearings.

4. The epicyclic gear train of claim 1 further including a first stage reduction gear system 200 coupled between said drive sun gear 10 and said input shaft, said first stage reduction gear system including a bevel gear 26 coupled to said drive sun gear 10 and at least two bevel pinions 25 in engagement with said bevel gear 26, said bevel pinions 25 driven by said input shaft.

5. The epicyclic gear train of claim 1 wherein said drive sun gear 10, said set of drive planet gear assemblies 13, and said planet gear carrier assembly 15 define a power path through said epicyclic gear train (A) between said input shaft and said output shaft.

6. The epicyclic gear train of claim 1 wherein said drive sun gear 10, said set of drive planet gear assemblies 13, said set of idler planet gear assemblies 14, said ring gear 12, said idler sun gear 11, and said planet gear carrier assembly 15 define a power path through said epicyclic gear train (A) between said input shaft and said output shaft.

7. The epicyclic gear train of claim 6 wherein said small planet gears 13B of said set of drive planet gear assemblies are configured to float in an annular space between said idler sun gear 11 and said ring gear 12.

8. The epicyclic gear train of claim 1 wherein said small planet gears 13B of said set of drive planet gear assemblies 13 are configured to float in an annular space between the said idler sun gear 11 and said ring gear 12.

9. The epicyclic gear train of claim 8 wherein an external self-aligning bearing 16A is disposed between each large planet gear 13A and each small planet gear 13B in each drive planet gear assembly 13, with an outer diameter surface 16B of an outer race ring 16C of said self-aligning bearing 16A having a spherical curvature, and wherein said outer diameter surface 16B is seated within a matching spherical bearing seat 16D in said planet carrier base 15A.

10. The epicyclic gear train of claim 8 wherein an external self-aligning bearing 16A is disposed between each large planet gear 13A and each small planet gear 13B in each drive planet gear assembly 13, said self-aligning bearing including a set of spherical ball bearings.

11. The epicyclic gear train of claim 8 wherein an external self-aligning bearing 16A is disposed between each large planet gear 13A and each small planet gear 13B in each drive planet gear assembly 13, said self-aligning bearing including a set of spherical roller bearings.

12. The epicyclic gear train of claim 8 wherein said planet shaft 13C in each drive planet gear assembly 13 includes an Oldham coupling between said large planet gear 13A and said small planet gear 13B, said Oldham coupling configured to permit a transfer of torque between said large planet gear and said small planet gear when said small planet gear is axially offset from said large planet gear.

13. An epicyclic gear train having a drive sun gear 10 coupled to an input shaft, an idler sun gear 11, and a ring gear 12 one of said sun gear or ring gear being fixed to a housing of the epicyclic gear train, comprising:
a set of drive planet gear assemblies 13 each including a large planet gear 13A in engagement with the drive sun gear 10, and at least one small planet gear 13B axially spaced from said large planet gear, said small planet gear in a floating engagement with said idler sun gear 11 and said ring gear 12;
a set of idler planet gear assemblies 14 each including an idler planet gear 14A and an idler planet shaft 14B, said idler planet gears in a meshing engagement with said idler sun gear 11 and said ring gear 12 and not in meshing engagement with said drive sun gear 10;

a planet carrier assembly 15 coupled to an output shaft, said planet gear carrier assembly including a planet carrier base 15A and a planet carrier plate 15B, said planet carrier plate 15B disposed axially opposite from said drive sun gear 10;

wherein the drive sun gear 10 and the idler sun gear 11 are co-axially arranged and spaced apart along a center axis;

wherein the ring gear 12 is disposed co-axially around the idler sun gear 11;

wherein the drive planet gear assemblies 13 are arranged in an annular region between the ring gear 12 and the idler sun gear 11, and are supported by the planet carrier assembly 15; and wherein the idler planet gear assemblies 14 are arranged in the annular space between the ring gear 12 and the idler sun gear 11, and are supported by the planet carrier assembly 15.

14. The epicyclic gear train of claim 13 further including a gear coupling for transmission of torque between said large planet gear 13A of each of said drive planet gear assemblies 13 and said small planet gears 13B.

15. The epicyclic gear train of claim 13 wherein said drive planet gear assemblies 13, said idler planet gear assembly 14, said idler sun gear 11, and said ring gear 12 are configured to provide at least two power paths between said drive sun gear 10 coupled to said input shaft and said planet gear carrier assembly 15 coupled to said output shaft.

16. The epicyclic gear train of claim 13 wherein said drive sun gear 10, said set of drive planet gear assemblies 13, and said planet gear carrier assembly 15 define a first power path through said epicyclic gear train (A) between said input shaft and said output shaft; and wherein said drive sun gear 10, said set of drive planet gear assemblies 13, and set of idler planet gear assemblies 14, said ring gear 12, said idler sun gear 11, and said planet gear carrier assembly 15 define a second power path through said epicyclic gear train (A) between said input shaft and said output shaft.

\* \* \* \* \*